(12) United States Patent
De Smet

(10) Patent No.: US 11,214,348 B2
(45) Date of Patent: Jan. 4, 2022

(54) AIRCRAFT STRUCTURE COMPRISING A SENSOR WITH AN IMPROVED JOINING SYSTEM AND AIRCRAFT COMPRISING SAID STRUCTURE

(71) Applicant: Airbus Operations S.A.S., Toulouse (FR)

(72) Inventor: Marie-Anne De Smet, Monbrun (FR)

(73) Assignee: Airbus Operations S.A.S.

( * ) Notice: Subject to any disclaimer, the term of this patent is extended or adjusted under 35 U.S.C. 154(b) by 418 days.

(21) Appl. No.: 16/453,119

(22) Filed: Jun. 26, 2019

(65) Prior Publication Data

US 2020/0010165 A1 Jan. 9, 2020

(30) Foreign Application Priority Data

Jul. 6, 2018 (FR) ...................................... 18 56235

(51) Int. Cl.
*B64C 1/06* (2006.01)
*B64C 7/00* (2006.01)
*G01D 11/24* (2006.01)

(52) U.S. Cl.
CPC .................. *B64C 1/06* (2013.01); *B64C 7/00* (2013.01); *G01D 11/245* (2013.01)

(58) Field of Classification Search
CPC ............ B64C 1/06; B64C 7/00; G01D 11/245
See application file for complete search history.

(56) References Cited

U.S. PATENT DOCUMENTS

| 7,050,716 | B2 * | 5/2006 | Nakaya | G03F 7/70275 355/53 |
| 7,545,998 | B2 * | 6/2009 | De Smet | G01M 11/083 385/12 |
| 2005/0061076 | A1 * | 3/2005 | Kim | G01M 5/0091 73/587 |
| 2008/0025664 | A1 * | 1/2008 | De Smet | G01N 21/9515 385/13 |
| 2008/0164866 | A1 | 7/2008 | Steinich et al. | |
| 2012/0206888 | A1 | 8/2012 | Schillinger et al. | |
| 2012/0247205 | A1 | 10/2012 | Hortig et al. | |
| 2014/0026656 | A1 | 1/2014 | Schwendimann et al. | |

FOREIGN PATENT DOCUMENTS

| DE | 4325782 A1 | 2/1995 |
| DE | 202007011834 U1 | 11/2007 |
| DE | 102010038988 A1 | 2/2011 |
| DE | 102011006594 A1 | 10/2012 |
| DE | 102011054231 A1 | 4/2013 |
| EP | 2690412 A1 | 1/2014 |

\* cited by examiner

*Primary Examiner* — Jamel E Williams
(74) *Attorney, Agent, or Firm* — Lerner, David, Littenberg, Krumholz & Mentlik, LLP

(57) ABSTRACT

A sensor is fixed on an aircraft structure by a joining system which includes at least one enclosure in which is positioned at least one transducer, at least one passage configured to allow at least one conducting element to pass through the enclosure, at least one flexible connection connecting each transducer present in the enclosure to said enclosure and at least one binder joining together the enclosure and the structure. This joining system makes it possible to limit the spread of the deformations of the structure toward the transducer or transducers and ultimately the risks of malfunction.

9 Claims, 1 Drawing Sheet

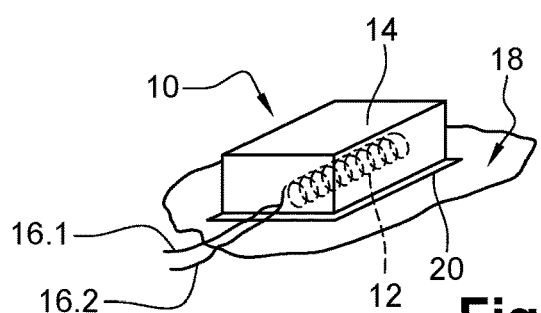
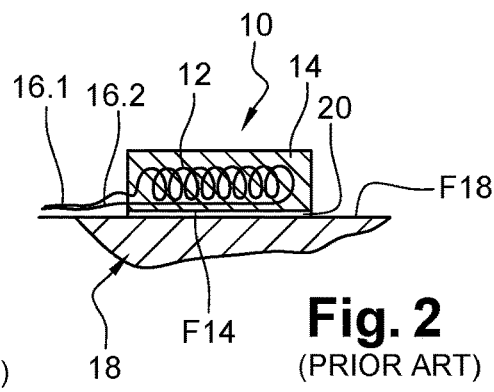
Fig. 1 (PRIOR ART)
Fig. 2 (PRIOR ART)
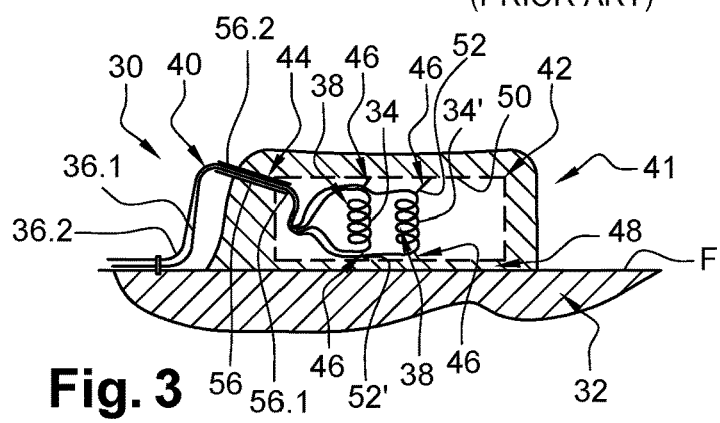
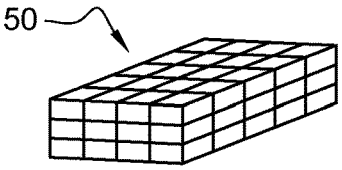
Fig. 3
Fig. 4
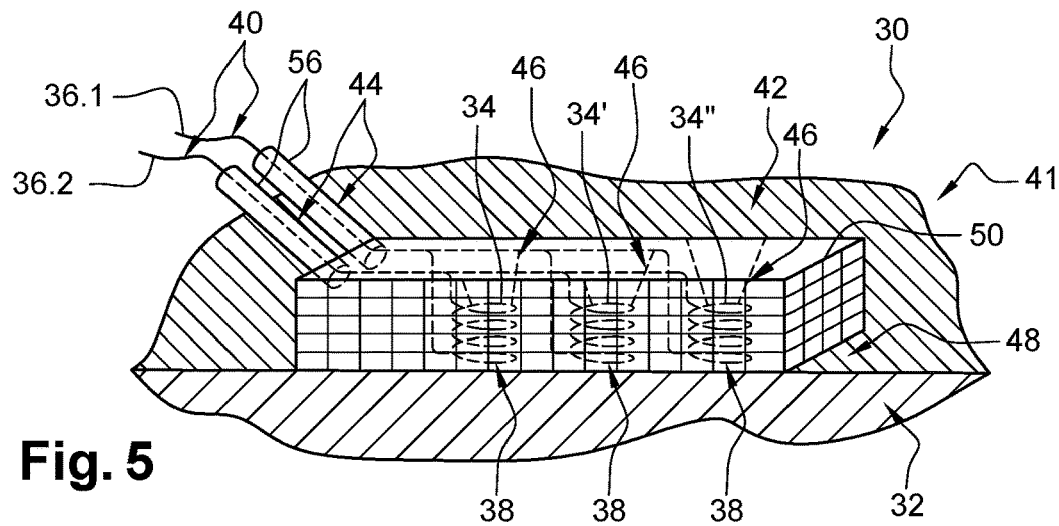
Fig. 5
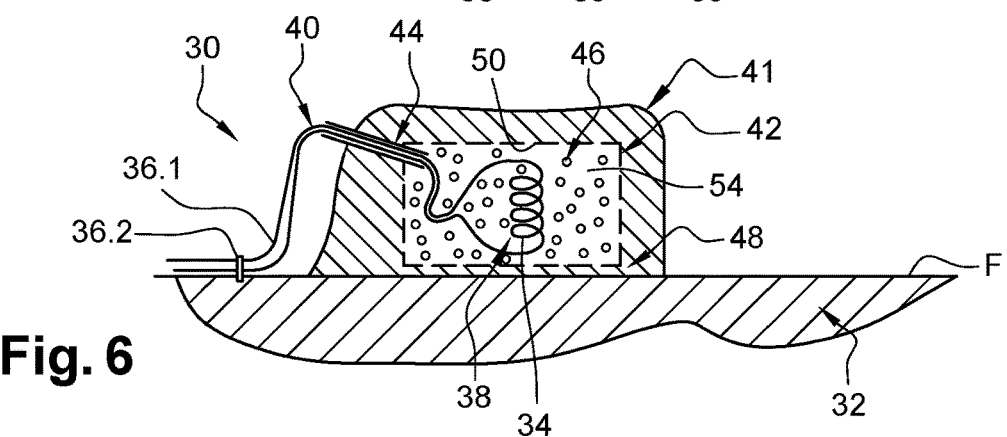
Fig. 6

AIRCRAFT STRUCTURE COMPRISING A SENSOR WITH AN IMPROVED JOINING SYSTEM AND AIRCRAFT COMPRISING SAID STRUCTURE

FIELD OF THE INVENTION

The present application relates to an aircraft structure comprising a sensor with an improved joining system and to an aircraft comprising said structure.

BACKGROUND OF THE INVENTION

According to one configuration that can be seen in FIGS. 1 and 2, a sensor 10 includes a coil 12 embedded in a rigid matrix 14 and two cables 16.1, 16.2 connected to the coil 12 and exiting the rigid matrix 14. The sensor 10 is fixed on a structure 18 of an aircraft by a binder 20 inserted between a face F14 of the rigid matrix 14 and a surface F18 of the structure 18. According to a configuration, the cables 16.1, 16.2 can be connected to the structure 18 at the exit from the rigid matrix 14.

In operation, the structure 18 deforms due to external stresses (temperature, vibration, moisture, mechanical loading, radiation, etc.). These deformations can be relatively large and reach values of approximately 5 mm per metre.

Since the structure 18 and the rigid matrix 14 are not produced from the same material, they have different behaviours, in response to the external stresses, which can lead to risks of the sensor 10 malfunctioning, for example due to a rupture at the binder 20, at the rigid matrix 14 and/or at the connection of the cables 16.1, 16.2.

BRIEF SUMMARY OF THE INVENTION

Aspects of the present invention may overcome all or some of the disadvantages from the prior art.

To this end, an embodiment of the invention is an aircraft structure having a surface on which is fixed a sensor comprising at least one transducer, configured to convert a physical characteristic into at least one signal, and at least one conducting element configured to carry said signal, said sensor being connected to the structure by a joining system.

According to an embodiment of the invention, the joining system comprises at least one enclosure in which is positioned said at least one transducer, at least one passage configured to allow at least one conducting element to pass through the enclosure, at least one flexible connection connecting each transducer present in the enclosure to said enclosure and at least one binder joining together the enclosure and the structure, the joining system being configured such as to not disrupt operation of the transducer.

Placing the transducer or transducers in an enclosure and connecting it or them to said enclosure via at least one flexible connection prevents the deformations of the structure from spreading in the direction of the transducer or transducers, which limits the risks of the sensor malfunctioning.

According to another feature, the enclosure comprises an open-worked cage which has an external surface and the binder which covers the external surface of the open-worked cage.

According to a configuration, the open-worked cage is a flexible lattice cage which has meshes with dimensions limiting the penetration of the binder into the lattice cage.

According to a first embodiment, the flexible connection comprises, for each transducer, at least one wire connecting the transducer to the enclosure, which wire is configured to hold the transducer in a given position and limit the spread of the deformations from the enclosure toward the transducer.

According to a second embodiment, the flexible connection is a filling material filling up the inside of the enclosure such as to embed each transducer, said filling material being material limiting the spread of the deformations from the enclosure toward the transducer or transducers.

According to another feature, each passage is configured to limit the grip between the enclosure and each conducting element which passes therethrough.

According to a configuration, each passage comprises a sleeve having a first end, which opens out inside the enclosure, and a second end, which opens out outside the enclosure, said sleeve being configured to house at least one conducting element and allow it to slide with respect to the enclosure.

According to another feature, each conducting element has an excess length inside the enclosure.

According to an embodiment, the binder is a rapid curing sealant.

Another embodiment of the invention is an aircraft comprising a structure according to one of the previous features.

BRIEF DESCRIPTION OF THE DRAWINGS

Other features and advantages will emerge from the following description of the invention, which description is given solely by way of example, with reference to the appended drawings wherein:

FIG. 1 is a perspective view of a sensor fixed on a structure which illustrates an embodiment from the prior art, FIG. 2 is a section of the sensor and of the structure that can both be seen in FIG. 1, FIG. 3 is a section of a sensor fixed on a structure which illustrates a first embodiment of the invention, FIG. 4 is a perspective view of a lattice cage of the sensor that can be seen in FIG. 3, FIG. 5 is a perspective view (with a partial tear-out of the binder) of a sensor fixed on a structure which illustrates an embodiment of the invention, and FIG. 6 is a section of a sensor fixed on a structure which illustrates a second embodiment of the invention.

DETAILED DESCRIPTION

FIGS. 3, 5 and 6 show a sensor 30 attached to a surface F of a structure 32 of an aircraft.

According to an embodiment, the sensor 30 comprises at least one coil 34 and two electrical cables 36.1, 36.2, exiting the sensor 30, which are configured to route an electrical signal between the coil 34 and a device for analysing the signal (not shown). According to a configuration that can be seen in FIG. 6, the sensor 30 comprises a single coil 34 which has two ends connected to the electrical cables 36.1, 36.2. According to other configurations that can be seen in FIGS. 3 and 5, the sensor 30 comprises several coils 34, 34', 34", with each of them having two ends connected to a couple of electrical cables 36.1, 36.2.

Regardless of the embodiment, the sensor 30 comprises at least one transducer 38, such as for example at least one coil 34, configured to convert a physical characteristic into at least one signal, and at least one conducting element 40, such as an electrical cable 36.1, 36.2 for example, configured to carry said signal outside the sensor 30. This conducting element 40 can also be used to power the transducer or transducers 38 with electrical energy.

The sensor 30 is connected to the structure 32 by a joining system 41 which comprises at least one enclosure 42 in which is positioned at least one transducer 38, at least one passage 44 configured to allow at least one conducting element 40 to pass through the enclosure 42, at least one flexible connection 46 connecting each transducer 38 present in the enclosure 42 to said enclosure 42 and at least one binder 48 joining together the enclosure 42 and the structure 32. The binder 48 is configured to assume a pasty state to allow the application thereof and a solid state after hardening. The joining system is configured such as to not disrupt the operation of the transducer or transducers 38. By way of example, each enclosure 42, each passage 44, each flexible connection 46 and each binder 48 are produced from a material that is not electrically conductive when the transducer 38 is in the form of a coil 34.

The enclosure 42 is a hollow element.

According to another first configuration, the enclosure 42 is an element separate from the binder 48 and provides the physical integrity of the sensor 30. By way of example, the enclosure 42 can be in the form of a lattice cage.

According to a configuration that can be seen in FIGS. 3 to 6, the enclosure 42 comprises an open-worked cage 50 which has an external surface and the binder 48 which covers the external surface of the open-worked cage 50. According to this configuration, the binder 48 provides the sealing and physical integrity functions of the sensor 30, the open-worked cage 50 making it possible to form a cavity inside the binder 48.

According to an embodiment that can be seen in FIG. 4, the open-worked cage 50 is a lattice cage, which can be seen in FIG. 4, which has meshes, the dimensions of which limit the penetration of the binder 48 into the lattice cage. The latter is produced from wire that is not electrically conductive. This lattice cage is flexible to allow it to fit the surface F of the structure 32 which may not be planar. In the example that can be seen in FIG. 4, the open-worked cage 50 has an approximately parallelepiped shape. Of course, the invention is not limited to this geometry.

According to an embodiment, the binder 48 is a rapid curing sealant, of PR type, used in the aeronautical industry. It is configured to connect the enclosure 42 and the structure 32.

When the enclosure 42 is in the form of an open-worked cage 50, the binder 48 can be inserted only between the open-worked cage 50 and the structure 32. In this case, the open-worked cage 50 provides the physical integrity of the sensor and the binder 48 provides the function for connection between the sensor 30 and the structure 32. This arrangement can be suitable for sensors that do not need to be sealed. In an alternative, the binder 48 can completely cover the open-worked cage 50. In this case, the binder 48 provides the connecting and sealing functions.

The flexible connection 46 is configured to hold each transducer 38 in the enclosure 42 in a given position, while limiting the spread of the deformations from the enclosure 42 toward the transducer or transducers 38.

According to a first embodiment illustrated in FIG. 3, for each transducer 38, the flexible connection 46 comprises at least one wire 52 connecting the transducer 38 to the enclosure 42, particularly to the open-worked cage 50. In the case of a coil 34, 34' positioned in a parallelepiped open-worked cage 50, the flexible connection 46 comprises, for each coil 34, 34', a first wire 52 connecting a first end of the coil 34, 34' to a first face of the open-worked cage 50 and a second wire 52' connecting a second end of the coil 34, 34' to a second face of the open-worked cage 50, opposite the first face.

According to a second embodiment illustrated in FIG. 6, the flexible connection 46 is a filling material 54 filling up the inside of the enclosure 42 such as to embed each transducer 38. This filling material 54 is a material limiting the spread of the deformations between the enclosure 42 and the transducer or transducers 38. By way of example, the filling material 54 is a flexible epoxy resin, a polyurethane foam, rubber, etc. The fact of providing an enclosure 42 and a filling material 54 makes it possible to separate the functions, the enclosure 42 being produced from a material suitable for providing the physical integrity of the transducer or transducers 38, the filling material 54 being suitable for limiting the spread of the deformations between the enclosure 42 and the transducer or transducers 38.

Each passage 44 is configured to limit the grip between the enclosure 42 and each conducting element 40 which passes therethrough. This configuration makes it possible to limit the risks of damage to each conducting element 40 or to the connection thereof to the transducer 38.

According to an embodiment, each passage 44 comprises a sleeve 56 having a first end 56.1, which opens out inside the enclosure 42, and a second end 56.2, which opens out outside the enclosure 42, and which is configured to house at least one conducting element 40 and allow it to slide with respect to the enclosure 42, from the inside toward the outside or from the outside toward the inside.

According to a configuration, the sensor 30 comprises as many sleeves 56 as conducting elements 40 passing through the enclosure 42. In an alternative, a sleeve 56 can contain several conducting elements 40. In the case of an enclosure 42 in the form of an open-worked cage 50, each sleeve 56 is rigidly connected to the open-worked cage 50.

In particular, each sleeve 56 is filled with a flexible filling material making it possible to seal the enclosure 42. This flexible filling material can be similar or not to the filling material 54. By way of example, this flexible filling material is a flexible epoxy resin, a polyurethane foam, rubber, etc.

Of course, the invention is not limited to this embodiment with respect to the passage or passages 44. Thus, each conducting element 40 could be covered with a coating that does not stick to the binder 48 allowing each conducting element 40 to slide with respect to the binder 48.

According to an arrangement, each conducting element 40 has an excess length inside the enclosure 42. This arrangement makes it possible to limit the risks of damage to each conducting element 40 or to the connection thereof to the transducer 38.

According to an operating mode, the transducer/transducers 38 is/are positioned in a flexible lattice cage. Each transducer 38 is connected to the flexible lattice cage by a flexible connection 46 in order to hold it in a given position in said flexible lattice cage. Each conducting element 40 is inserted into a sleeve 56 connected to the flexible lattice cage. Thus, each sensor 30 comprises the transducer or transducers 38, the conducting element or elements 40, the flexible lattice cage, the flexible connection or connections 46 and the sleeve or sleeves 56.

When the sensor 30 is put on the structure 32, the flexible lattice cage is put against the surface F of the structure 32 such as to shape it according to the geometry of the surface F. Next, the binder 48 is deposited on the surface F of the structure 32 and then the flexible lattice cage is placed on the binder 48. Finally, the flexible lattice cage is covered by the binder 48. After the binder 48 has hardened, the sensor 30 is connected to the structure 32.

Placing the transducer or transducers in an enclosure 42 and connecting it or them to said enclosure 42 by at least one flexible connection 46 prevents the deformations of the structure 32 from spreading in the direction of the transducer or transducers 38, and this limits the risks of the sensor malfunctioning.

Providing an open-worked cage 50 covered by the binder 48 makes it possible to form a simple sealed enclosure, the binder 48 providing the function for connection between the enclosure 42 and the structure 32 and the function for sealing the enclosure 42, and this also limits the risks of the sensor 30 malfunctioning.

Providing an open-worked cage 50 in the form of a flexible lattice cage makes it possible, when putting the sensor 30 in place, to shape it according to the geometry of the surface F of the structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structure comprising:
   a surface on which is fixed a sensor comprising at least one transducer, configured to convert a physical characteristic into at least one signal, and at least one conducting element configured to carry said signal, said sensor being connected to the structure by a joining system, wherein the joining system comprises:
   at least one enclosure in which is positioned said at least one transducer;
   at least one passage configured to allow the at least one conducting element to pass through the enclosure;
   at least one flexible connection connecting each of the at least one transducer present in the enclosure to said enclosure; and
   at least one binder joining together the enclosure and the structure, the at least one enclosure including a flexible lattice open-worked cage having an external surface and meshes with dimensions limiting the penetration of the binder into the lattice open-worked cage, the binder covering the external surface of the lattice open-worked cage.

2. The aircraft structure according to claim 1, wherein the transducer is a coil and the joining system is produced from a material that is not electrically conductive.

3. The aircraft structure according to claim 1, wherein the flexible connection comprises, for each of the at least one transducer, at least one wire connecting the corresponding transducer to the enclosure, wherein the at least one wire is configured to hold the corresponding transducer in a given position and limit the spread of the deformations from the enclosure toward each of the at least one transducer.

4. The aircraft structure according to claim 1, wherein the flexible connection is a filling material filling up the inside of the enclosure such as to embed each of the at least one transducer, wherein said filling material is a material limiting the spread of the deformations from the enclosure toward the at least one transducer.

5. The aircraft structure according to claim 1, wherein each of the at least one passage is configured to limit the grip between the enclosure and each of the at least one conducting element passing therethrough.

6. The aircraft structure according to claim 5, wherein each of the at least one passage comprises a sleeve having a first end, which opens out inside the enclosure, and a second end, which opens out outside the enclosure, said sleeve being configured to house the at least one conducting element and to allow the at least one conducting element to slide with respect to the enclosure.

7. The aircraft structure according to claim 1, wherein each of the at least one conducting element has an excess length inside the enclosure.

8. The aircraft structure according to claim 1, wherein the binder is a rapid curing sealant.

9. An aircraft comprising a structure according to claim 1.

* * * * *